Patented Oct. 18, 1949

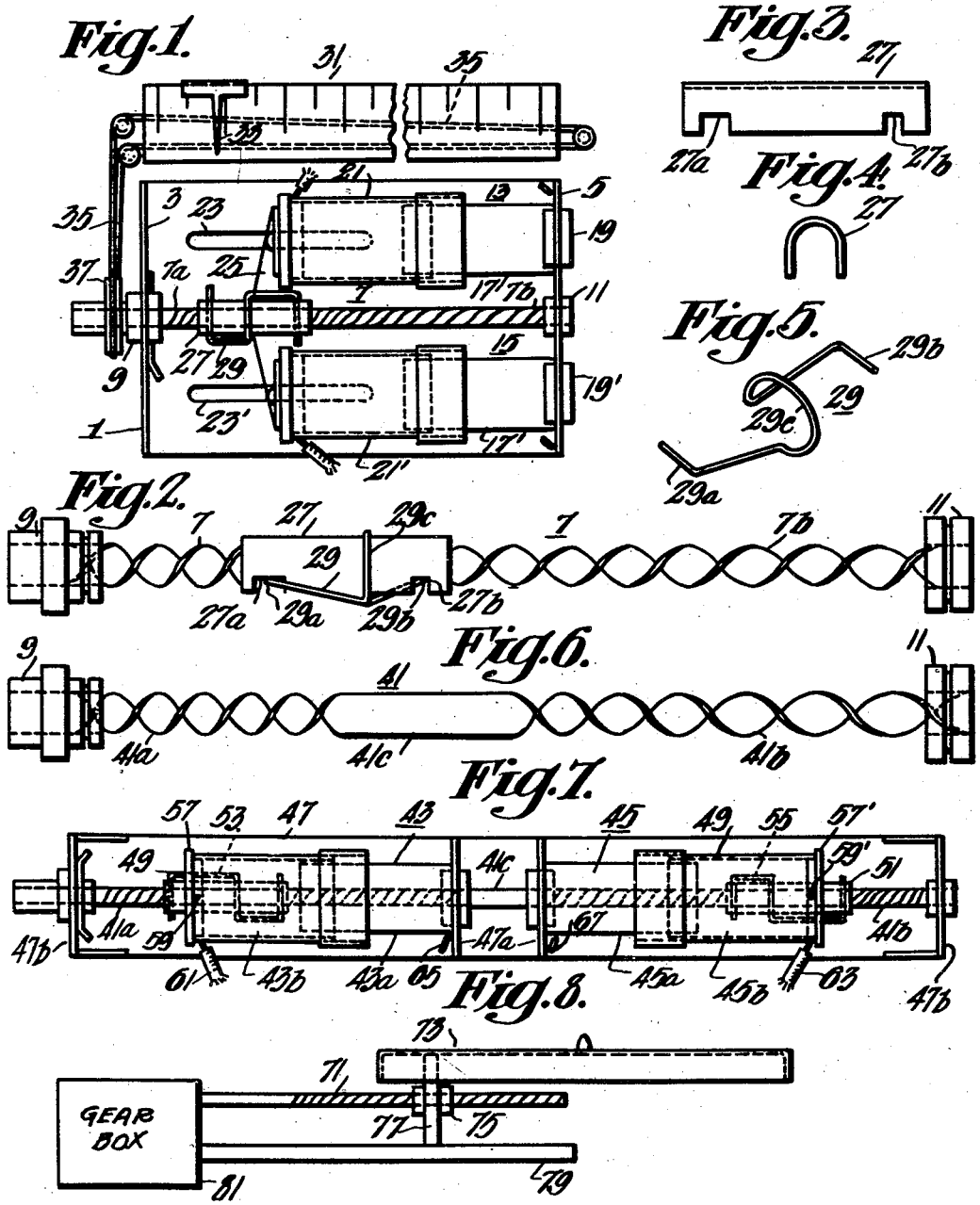

2,485,464

UNITED STATES PATENT OFFICE 2,485,464

VARIABLE PITCH DRIVE SCREW AND TUNING SYSTEM

Harold B. Stott, Glen Olden, Pa., assignor to Radio Corporation of America, a corporation of Delaware Application November 29, 1943, Serial No. 512,113

5 Claims. (Cl. 74—459)

This invention relates to mechanical movements and has for its principal object to provide an improved non-linear transmission (i. e. a drive mechanism wherein equal increments of angular rotation of the driving element produce non-linear or unequal increments of movement of the driven element).

Another object of the invention is to provide a non-linear transmission wherein the driving and driven elements are coupled in direct driving relation, instead of indirectly through interchangeable gears or the like.

Another object of the present invention is to provide an inexpensive, compact and trouble-free continuously-variable transmission, and one which lends itself readily for use in radio-tuners, phonograph turn-tables and other apparatus of the type employing mechanical forces of relatively low power in their operation.

Other objects, advantages and applications of the invention together with certain preferred details of construction appear in the following specification and in the accompanying drawing, wherein:

Figure 1 is an elevational view of a radio tuner incorporating a non-linear or variable ratio drive according to the invention.

Figure 2 is an elevational view of the variable pitch screw employed in the drive of Figure 1 and showing one form of follower for the said screw, Figure 3 is a side elevation, and Figure 4 is an end view of the carrier for the screw follower of Figures 1 and 2, Figure 5 is a view in perspective of the spring follower for the screw of Figures 1, 2 and 3, Figure 6 is an elevational view of a "duplex" variable pitch driving screw according to the invention, Figure 7 is an elevational view of a tuning mechanism for a super-heterodyne receiver incorporating the duplex driving element of Figure 6, and Figure 8 shows another form of mechanical movement incorporating the invention and including a screw of variable pitch.

In the embodiment of the invention shown in Fig. 1, 1 designates a radio chassis or base having upstanding ends 3 and 5 between which a shaft or screw 7, having continuous turns 7a, 7b of different pitch, is supported for rotation in oppositely located bearings 9 and 11. The screw 7 is preferably constituted of metal and may be formed either from wire or of flat stock.

Mounted in parallel array on opposite sides of the screw 7 are two adjustable tuning elements 13 and 15 each of which comprises a stationary part 17 (17'), which is affixed to the rear panel 5 of the chassis as by a grommet 19 (19'), and a movable part 21 (21') which is slidably mounted as on a track, or in a slot 23 (23'), on the panel or base 1. These movable parts 21, 21' are connected by means of a pair of oppositely extending arms 25 to a sleeve or carrier 27 which is mounted to permit of axial movement on or along the screw 7.

As shown more clearly in Fig. 2, the screw 7 is coupled in driving relation with the carrier 27 by means of a follower 29 which, as shown in Fig. 5, may comprise a wire constituted of spring metal (e. g. piano wire) having its ends 29a, 29b bent in oppositely directed and preferably parallel relation and which is provided, intermediate its ends, with a flattened loop 29c. The carrier 27 may comprise either a cylindrical or an elongated U-shape sleeve (see Figs. 3 and 4) which has a sliding fit on the screw 7. In either event, the sleeve or carrier 27 is provided on each side with two slots 27a, 27b within which the oppositely extending ends 29a, 29b of the wire 29 are seated in engagement with the screw 7, when the wire loop 29c is fitted over the outer surface of the said sleeve. The width and depth of the slots 27a, 27b in the sleeve 27 are sufficient to permit the biased ends 29a and 29b of the follower 29 to move longitudinally and vertically within the boundaries of the said slots. This allows the spring ends, which are biased into engagement with the edge of the screw, to follow its variable pitch, i. e. tangent to the edges of the turns of the screw.

Thus, when the pitch of the screw changes to a low value exceeding the allowable span of the spring ends one end will rise and fall across the next "turn" in the screw and this, too, without any backlash or jumping, since the other end of the spring will stay across its groove and both ends are under tension. By setting the transverse loop 29c of the spring off center, that is, not exactly midway between the ends of the spring, the longer section of the wire will offer the least resistance and the end of this section will be the one that "jumps" when the maximum span of the spring has been reached.

The tuning elements 13 and 15 shown in Fig. 1 comprise a pair of co-axial capacitors. However, if desired, one or both of the tuning elements may be inductance tuners, say, of the type (not shown) wherein variable tuning is effected by moving a magnetic core with respect to a coil. In either event, a tuning scale 31 having equally spaced scale markings and a pointer 33, is provided for indicating the frequency to which the set is tuned. As shown in the drawings, the pointer 33 is adapted to be moved to and fro along the scale 31 by a cord 35 which is driven by a pulley 37 fixed on the knob-end of the tuning shaft or screw 7.

The utility of the variable pitch turns of the screw 7 will be apparent when it is recalled that in prior art tuning systems employing a co-axial capacitor (or other linearly movable tuning element) a given increment of movement will produce a greater change in the frequency of the tunable circuit at the high frequency portion of the tuning band than it will at the low frequency portion. Accordingly, where, as in the instant case, the indicia or scale markings on the tuning scale 31 are equally spaced, the pointer 33 must be moved at different rates over the said different portions of the scale 31. It is the variable pitch of the screw 7 that correlates the movement of the pointer 33 with that of the tuning elements 13 and 15 and causes them to track.

Where two or more devices are to be driven with different linear or non-linear movements the driving element may comprise a single spindle or shank having a threaded section individual to each driven element. Thus, in a superheterodyne radio receiver, one threaded section of the driving element may be employed in tuning the local oscillator and the other for tuning the radio frequency or mixer stage so that, when the proper driving ratios are selected, a constant difference or "beat" frequency is achieved throughout the entire frequency range of the receiver. Such a dual driving element is shown in Fig. 6 and in Fig. 7 wherein the said driving element is shown incorporated in a superheterodyne tuning mechanism.

As shown more clearly in Fig. 6, the driving element, which is here designated 41, comprises two discrete threaded sections 41a, 41b of opposite pitch and an intermediate non-threaded portion 41c. In the instant case, the first threaded section 41a has turns of uniform pitch while the helical rib or thread of the oppositely extending section 41b is of non-uniform pitch throughout its length, the turns of narrowest pitch being, in this case, adjacent to the outer end of the screw. Where necessary or desirable, both sections of the screw 41 may be of duplicate or non-duplicate variable pitch. In the instant case, referring now to Fig. 7, the separate screw sections 41a and 41b are employed for adjusting the capacitance of two co-axial capacitors 43 and 45 which are mounted in spaced relation along a common axis on or within a suitable chassis or frame 47. The frame here illustrated is in the form of a cylindrical metal tube or shield containing two centrally located metal plates or spiders 47a, upon which the stationary armatures 43a, 45a of the co-axial capacitors are supported and two end-plates 47b in which the opposite ends of the driving element or screw 41 have a bearing fit. The screw 41 and the carriers 49, 51 and followers 53 and 55, which serve to couple the movable parts 43b, 45b of the capacitors 43 and 45 to the screw, are mounted within the bore of the said tuning elements and are connected thereto by insulating discs 57 and 57' which are fixed on the carriers 49 and 51, respectively, as by pins 59, 59'.

When the tuning mechanism of Fig. 7 is incorporated in a superheterodyne radio receiver the linearly driven capacitor 43 will ordinarily form part of the radio frequency circuit and the other or non-linearly driven capacitor 45 will comprise the variable element of the frequency determining circuit for the local oscillator. The necessary circuit connections may be established through flexible leads 61 and 63 individual to the movable armatures 43b and 45b, and through grounded fixed leads 65 and 67 connected to the stationary armatures 43a, 45a, respectively. It is apparent that at some sacrifice in compactness the driving screw 41 and the mechanical coupling means therefor may be mounted outside (instead of inside) the driven device, for example, in the manner indicated in Fig. 1.

Another one of numerous possible applications of the invention is shown in Fig. 8. Here, a screw 71 of variable pitch is employed as one element of a variable speed transmission for driving a turn-table (say, a phonograph turn-table) 73 at a desired non-uniform speed. In this case, the carrier 75 on the screw 71 serves as a bearing for a friction wheel 77 which is rotated by means of a shaft 79 against which the wheel bears. The shaft 79 will be understood to be driven at a preferably constant speed by means of a motor (not shown) and gear box 81. The carrier or sleeve 75 (and hence the wheel 77 thereon) is moved along the screw as the screw is rotated, preferably at a constant speed, by suitable gears in the box 81. Since the rotary speed of the wheel 77 is constant the speed at which the turn-table 73 is driven is obviously a function of the point along the radius of the turn-table to which the driving force is applied. However, the variable pitch of the screw 71 urges the wheel inwardly (or outwardly, as the case may be) along this radius at a non-linear rate. Hence, the rate of change in the speed of the turn-table may be predetermined in any given installation (e. g. for phonograph records of different diameters so that the "groove speed" of the record, with respect to the pick-up device, not shown, may be rendered constant, or nearly so).

It will be apparent from the foregoing that the present invention provides an inexpensive, compact and trouble-free continuously-variable transmission, and one which lends itself readily for use in radio-tuners, phonograph turn-tables and other apparatus of the type employing mechanical forces of relatively low power in their operation.

What is claimed is:

1. In combination, a driving member and a driven member, one of said members comprising a screw having turns of variable pitch and the other of said members comprising a resilient follower mounted for relative movement with respect to said screw and biased into engagement solely with the edge of the variable pitch turns thereof.

2. In combination, a driving member comprising a screw having turns of variable pitch and supported for rotation about its long axis, a driven member mounted adjacent to said screw for movement along said axis, resilient coupling means mounted on said driven member and biased to follow the edge of the said variable pitch turns when said screw is rotated, and means for rotating said screw.

3. In combination, a driving member comprising a screw having turns of variable pitch and supported for rotation about its axis, a driven member mounted adjacent to said screw for movement along said axis, and spring coupling means carried by said driven member and biased to engage the edge of the said variable pitch turns of said screw.

4. In combination, a driving member comprising a screw having turns of variable pitch and supported for rotation about its axis, a sleeve mounted for slidable movement along said screw and means supported on said sleeve for coupling said sleeve in driven relation with respect to said screw, said coupling means comprising a wire constituted of spring metal wrapped about said sleeve with its opposite ends extending across said axis and biased into engagement with different of the said variable pitch turns of said screw.

5. In combination, a rotatable shaft having a plurality of threaded portions extending in opposite directions from points intermediate the ends of said shaft, said threaded portions having threads of different pitch, a plurality of driven members mounted for movement in paths parallel to the axis of said shaft, a follower individual to each of said threaded portions of said shaft and each coupled in driving relation with the edge of the thread of one of said driven members, the thread of at least one of said threaded portions being of variable pitch, and means for rotating said shaft whereby equal increments of angular rotation of said shaft produce unequal increments of movement among said plurality of driven members.

HAROLD B. STOTT.

REFERENCES CITED

The following references are of record in the file of this patent:

UNITED STATES PATENTS

| Number | Name | Date |
|---|---|---|
| 495,296 | Boynton | Apr. 11, 1893 |
| 853,719 | Munro | May 14, 1907 |
| 994,386 | Gustavson et al. | June 6, 1911 |
| 1,300,047 | Thomas | Apr. 8, 1919 |
| 1,948,697 | Bailly | Feb. 27, 1934 |
| 2,247,212 | Trevor | June 24, 1941 |
| 2,275,404 | Banning | Mar. 10, 1942 |
| 2,302,732 | Yetman | Nov. 24, 1942 |

Certificate of Correction

Patent No. 2,485,464                         October 18, 1949

HAROLD B. STOTT

It is hereby certified that errors appear in the printed specification of the above numbered patent requiring correction as follows:

Column 2, lines 35 and 36, strike out ", i. e. tangent to the edges of the turns of the screw" and insert the same in line 32, after the word "slots" and before the period;
and that the said Letters Patent should be read with these corrections therein that the same may conform to the record of the case in the Patent Office.

Signed and sealed this 11th day of April, A. D. 1950.

[SEAL]

THOMAS F. MURPHY,
                                              *Assistant Commissioner of Patents.*